United States Patent [19]

Krolak et al.

[11] 4,191,401

[45] Mar. 4, 1980

[54] MAIN FRAME NOSE CONSTRUCTION

[75] Inventors: Ronald L. Krolak, Morton, Ill.;
Delbert G. Nelson, West Bountiful, Utah

[73] Assignee: Caterpillar Tractor Co., Peoria, Ill.

[21] Appl. No.: 816,632

[22] Filed: Jul. 18, 1977

[51] Int. Cl.² .................................... B62D 27/00
[52] U.S. Cl. ................................ 280/796; 280/781
[58] Field of Search ............ 280/795, 796, 5 R, 5 A, 280/5 F, 781; 180/89.1; 296/28 R

[56] References Cited

U.S. PATENT DOCUMENTS

| 1,548,078 | 8/1925 | Ward | 280/796 |
|---|---|---|---|
| 1,654,107 | 12/1927 | Andren | 280/781 |
| 1,872,506 | 8/1932 | Sage | 280/796 |
| 2,194,349 | 3/1940 | Almdale | 280/796 |
| 3,279,816 | 10/1966 | Issigonis | 296/28 R |

Primary Examiner—Philip Goodman
Attorney, Agent, or Firm—Phillips, Moore, Weissenberger, Lempio & Majestic

[57] ABSTRACT

A nose construction spanningly connects the front ends of a pair of generally parallel linearly extending vehicle frame members. The construction comprises a tube extending from the front end of one to the front end of the other of the frame members and a pair of gusset structures unitarily formed of the tube, one adjacent each end thereof, each extending along the frame members towards a rear end thereof. The tube is affixed to the frame members. The gusset structure is also affixed to the frame members.

11 Claims, 4 Drawing Figures

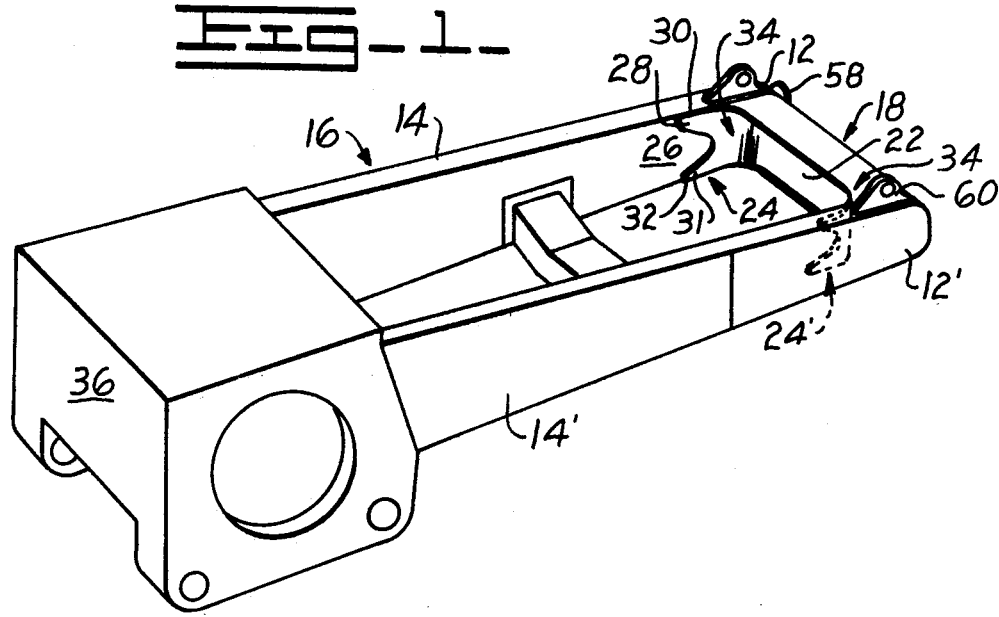
Fig-1-
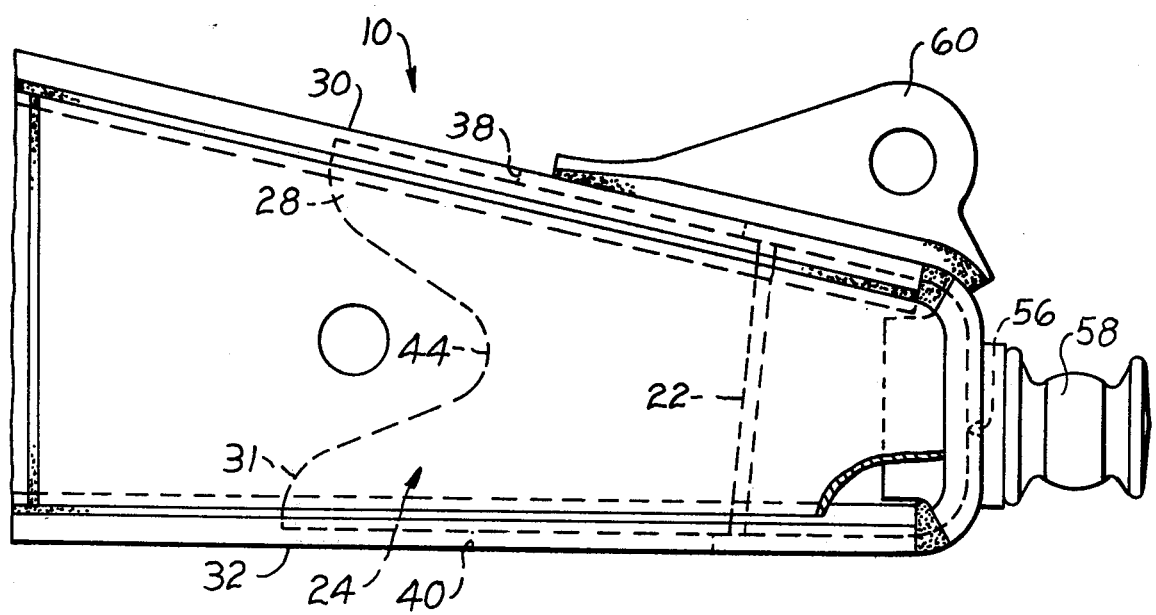
Fig-2-

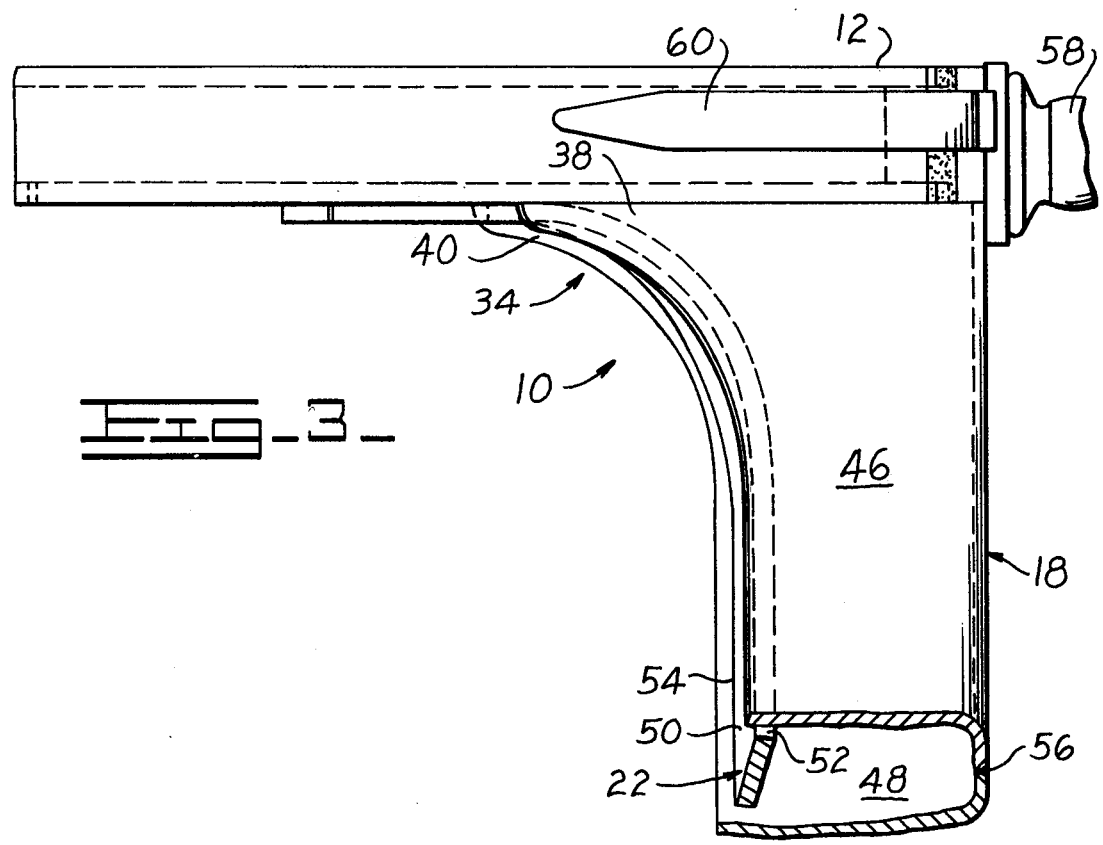
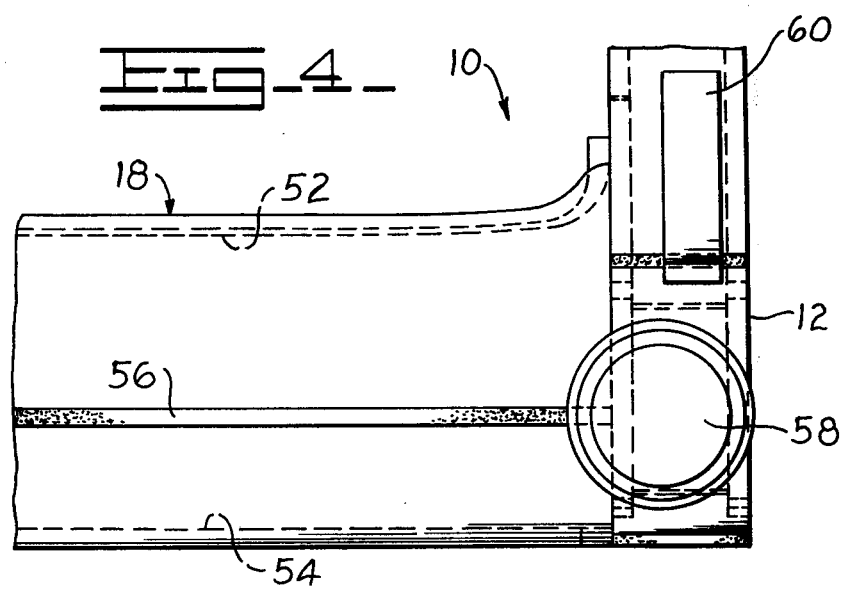

MAIN FRAME NOSE CONSTRUCTION

BACKGROUND OF THE INVENTION

1. Field of the Invention

The invention relates to a nose construction for a vehicle frame. Such vehicle frames as are used on heavy earthworking equipment such as dozers and the like are particularly aided by the nose construction of the present invention.

2. Prior Art

Conventional earthworking equipment, both track-type and wheel-type vehicles, have a heavy duty main frame. Generally such frames comprise a pair of generally parallel frame members which extend longitudinally along the sides of the vehicle. The parallel frame members are then joined at a front or nose end thereof, generally by a tube which is welded to each of the frame members and is of generally heavy construction. The nose construction of such a frame will often support heavy loads as are, for example, exerted thereupon by dozer bracing trunions and the like which are often supported thereby and by other heavy earthworking implements supported thereby.

A serious problem has existed with such prior art structures in that where the tube connects to the two frame members, there is a tendency for significant failure to occur. Basically, there is a great deal of force dissipated at the welding of the tube to each of the frame members and the force is applied generally at right angles to the weld. Attempts to cut down on this failure problem have included making the tube extremely heavy which is in itself a disadvantage in being expensive and adding unnecessarily to the weight of the structure and in taking special care with the welds. The prior art solutions to these problems have, however, not been by any means fully successful.

SUMMARY OF THE INVENTION

The present invention is directed to overcoming one or more of the problems as set forth above.

According to the present invention a nose construction is provided for spanningly connecting the front ends of a pair of generally parallel linearly extending vehicle frame members. The nose construction comprises a tube extending from the front end of one to the front end of the other of said pair of frame members. A pair of gusset means are unitarily formed with said tube, one adjacent each end thereof and each extending along the in-facing side of the exterior of the respective one of said frame members toward the rear end thereof. Means are included for affixing the tube to the frame members and for affixing the gusset means to the frame members. Each pair of the gusset means further includes an upper gusset and a lower gusset and a central gusset. The central gusset is unitarily formed with the tube. The upper gusset, the lower gusset and the central gusset extend along the respective in-facing side of the respective intermediate portion of the respective frame member. Each of said central gussets further comprises an upper branch abutting a respective upper gusset. A lower branch abutting a respective lower gusset and a central region terminating short of the rearward termination of both the upper and lower branch.

The invention further relates to a method of preparing a nose construction as just described from a U-shaped member, a top member and a bottom member which are affixed together in a particular manner to form the aforementioned tube and gusset means.

BRIEF DESCRIPTION OF THE DRAWINGS

The invention will be better understood by reference to the figures of the drawings wherein like numbers denote like parts throughout and wherein:

FIG. 1 illustrates, in perspective, a main frame having a nose construction in accordance with the present invention;

FIG. 2 illustrates, in blownup side view, partially cut away, a nose construction in accordance with the present invention;

FIG. 3 illustrates in partial top view, partially cut away, a nose construction in accordance with the present invention; and FIG. 4 illustrates in partial end view, a nose construction in accordance with the present invention.

DETAILED DESCRIPTION OF THE PREFERRED EMBODIMENT

Adverting now specifically to the structures shown in the drawings, there is illustrated therein a nose construction 10 for spanningly connecting the front ends 12, 12' of a pair of generally parallel linearly extending vehicle frame members 14, 14' of a vehicle frame 16.

The nose construction 10 comprises a tube 18 which extends from the front end 12 of one of the frame members 14 to the front end 12' of the other of the pair of frame members 14'. The tube 18 comprises a generally U-shaped member 22 having legs 24, 24'. The legs 24, 24' each serve as a central gusset for connection to the respective frame members 14, 14'. The leg 24, or more particularly the central gusset formed therefrom, extends along an intermediate portion 26, of the frame member 14. For convenience, only one end of the tube 18, namely the end affixed to the frame member 14 will be discussed hereinafter. It will be realized, however, that the nose construction 10 is symmetrical about a plane parallel to and intermediate the members 14, 14'.

In the preferred embodiment of the present invention the central gussets formed from leg 24, comprises an upper branch 28 running along a top portion 30 of the frame member 14, as well as a lower branch 31 extending along a bottom portion 32 of the frame member 14.

Gusset means 34 comprising one of a symmetrical pair thereof is unitarily formed of the tube 18 adjacent an end thereof. The gusset means 34 extends along the frame member 14 towards a rear end 36 of the vehicle frame 16. The gusset means 34 comprises an upper gusset 38, seen most clearly in FIG. 3, which extends along the top portion 30 of the frame member 14. The gusset means 34 further comprises a lower gusset 40 which is also unitarily formed of the tube 18 and which extends along the bottom portion 32 of the frame member 14. It will be noted that the central gusset formed of the leg 24 has the upper branch 28 thereof abutting the upper-gusset 38 and also has the lower branch 31 thereof abutting the lower gusset 40. Further, a central region 44 of the central gusset-leg 24 preferably terminates short of the rearward termination of the respective upper and lower branches 28 and 31. This allows a weld to be made along the curved surface formed from 28 to 44 to 31 thus assuring that stresses in the weld are delocalized uniformly distributed and exerted generally non-perpendicularly to the weld. It will be seen that over all the gusset means 34 then each comprises the central gusset-leg 24 which is preferably broken into the upper branch 28 and the lower branch 31, the upper gusset 38 and the lower gusset 40.

It is clear that the tube 18 must be affixed to the frame member 14 and that the gusset means 34 also be affixed to the frame member 14. This is accomplished in general by conventional welding techniques. Because of certain features of the invention as will become more apparent in following, the preferred nose construction 10 of the present invention is particularly adapted for weld construction and is further particularly adapted for providing a nose construction 10 of greatly increased weld strength.

Turning again to the structure of the tube 18, it will be seen that it preferably comprises in addition to the previously mentioned U-shaped member 22, a top member 46 which serves as a top of the tube 18 and at the same time serves as the upper gusset 38 and a bottom member 48 which serves as a bottom of the tube 18 and at the same time serves as the lower gusset 40 of the gusset means 34. It will further be noted that a bridge 50 of the U-shaped member 22 then serves as a rear closure of the tube 18.

Method

The structure of the nose construction 10 as well as the method of preparing the nose construction 10 will be apparent from considering the following. A top edge 52 of the U-shaped member 22 is affixed by welding to the top linearly extending member 46. A bottom edge 54 of the U-shaped member 22 is affixed as by welding to the bottom linearly extending member 48. The upper gusset 38 abuts with the top edge 52 of the leg of the U-shaped member 22 while the lower gusset 40 abuts the bottom edge 54 of the leg of the U-shaped member 22. Thus, the upper-gusset 38 and the lower gusset 40 each abut the central gusset-leg 24. After the aforementioned affixing is completed by welding, the top member 46 is affixed to the bottom member 48 by welding along a weld groove 56. This serves to form the tube 18 which then comprises the U-shaped member 22, the top member 46 and the bottom member 48. The ends of the tube 18 and each of the gussets 38, 40 and 24 are weldingly affixed to the respective frame member 14.

Through proceeding in the manner just described there results a unitary structure wherein the overall gusset 24, 38 and 40 is of the self-forming variety. Also, since welding occurs first between the U-shaped member 22 and the top member 46 and the bottom member 48 (that is before welding together of the top member 46 and the bottom member 48) the welds can be formed in a straightforward and generally trouble free manner. Thereafter, when the top member 46 is welded to the bottom member 48 along the weld groove 56, the overall tube 18 can be formulated. Still further, in the particular embodiment wherein the leg 24 is formed into the upper and lower gusset branch 28 and 31, a complex or curved weld line occurs along the frame members 14 thus adding to the overall strength of the structure. It is further noted that there are substantially no right angle welds at the points of greatest strain, namely at the points of joinder of the tube 18 to the frame member 14. What results is a relatively low cost structure, primarily due to the relatively low cost of the conventional welding techniques utilizable and the relatively light construction thereof. Construction problems on welds are avoided and failure at right angle welds is substantially eliminated. Further, the nose construction 10 and the frame member 14 thereadjacent can carry normal frame supported structures such as a trunion 58 as illustrated (and which is useful for supporting dozer diagonal braces and the like). Also, a radiator guard mounting block 60 can advantageously be supported by the nose construction 10.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A nose construction for spanningly connecting the front ends of a pair of generally parallel linearly extending vehicle frame members, comprising:
    a tube extending from the front end of one to the front end of the other of said pair of frame members;
    a pair of gusset means unitarily formed of said tube, one adjacent each end thereof, each extending along an in-facing side of the exterior of the respective one of said frame members toward a rear end thereof;
    means for affixing said tube to said frame members; and
    means for affixing said gusset means to said frame members;
    wherein each of said pair of gusset means further comprises an upper gusset unitarily formed of said tube and extending along a top portion of the respective frame member, and a lower gusset unitarily formed of said tube and extending along a bottom portion of a respective frame member, and a central gusset unitarily formed with said tube, said upper gusset, said lower gusset, and said central gusset extending along the respective in-facing side of a respective intermediate portion of a respective frame member; and
    wherein each of said central gussets comprises an upper branch abutting a respective upper gusset, a lower branch abutting a respective lower gusset, and a central region terminating short of the rearward termination of both of said upper and lower branches.

2. A nose construction as in claim 1, wherein said tube comprises a generally U-shaped member having the legs thereof serving as said central gussets; a top member serving as said upper gussets and as a top of said tube, and a bottom member serving as said lower gussets and as a bottom of said tube and including:
    means for affixing said generally U-shaped member to said top member;
    means for affixing said generally U-shaped member to said bottom member; and
    means for affixing said top member to said bottom member.

3. A nose construction as in claim 2, wherein each of said affixing means comprise welds.

4. A nose construction as in claim 3, wherein said top member and said bottom member extends further rearwardly than the bridge of said U-shaped member thereadjacent.

5. A nose construction for spanningly connecting the front ends of a pair of generally parallel linearly extending vehicle frame members, comprising:
- a tube extending from the front end of one to the front end of the other of said pair of frame members;
- a pair of gusset means unitarily formed of said tube, one adjacent each end thereof, each extending along an infacing side of the exterior of a respective one of said frame members toward a rear end thereof;
- means for affixing said tube to said frame members; and
- means for affixing said gusset means to said frame members;
- said tube comprising a generally u-shaped member having the legs thereof each serving as a central gusset of each respective one of said pair of gusset means and the bridge thereof serving as a rear closure of said tube; said tube further comprising a top member serving as an upper gusset of each respective one of said pair of gusset means and as a top of said tube; said tube further comprising a bottom member serving as a lower gusset of each respective one of said pair of gusset means and as a bottom of said tube, and;
- said nose construction further comprising means for affixing said generally u-shaped member to said top member, means for affixing said generally u-shaped member to said bottom member, and means for affixing said top member to said bottom member.

6. A nose construction as in claim 5, wherein each of said upper gussets is unitarily formed of said top member and extends along a top portion of a respective infacing side of a respective frame member and each of said lower gussets is unitarily formed of said bottom member and extends along a bottom portion of a respective infacing side of a respective frame member.

7. A nose construction as in claim 6, wherein each of said affixing means comprise welds.

8. A nose construction as in claim 7, wherein said top member and said bottom member extend further rearwardly than the bridge of said U-shaped member thereadjacent.

9. A nose construction as in claim 8, wherein each of said central gussets comprises an upper branch abutting the top member, said top member also serving as an upper gusset, a lower branch abutting the bottom member, said bottom member also serving as a lower gusset and a central region terminating short of the rearward termination of both the said respective upper and lower branches.

10. A method of preparing a nose construction for spanningly connecting the front ends of a pair of generally linearly extending vehicle frame members, comprising:
- affixing a top edge of a U-shaped member having the legs thereof shaped into unitary central gussets, to a top linearly extending member having the ends thereof shaped into upper gussets, with said upper gussets abutting said central gussets; and
- affixing a bottom edge of said U-shaped member to a bottom linearly extending member having the ends thereof shaped into lower gussets with said lower gussets abutting said central gusset; and thereafter
- affixing said top member to said bottom member to form a tube comprising said U-shaped member, said top member and said bottom member; and
- affixing the ends of said tube and said gussets to the respective infacing sides of each of said frame members.

11. A method as in claim 10, wherein said each of said affixing steps comprises welding.

* * * * *